US012725606B2

(12) United States Patent
Kang et al.

(10) Patent No.: US 12,725,606 B2
(45) Date of Patent: Sep. 1, 2026

(54) MULTI-MODAL VOICE RECOGNITION SYSTEM AND METHOD FOR CONVERSATION SUMMARIZATION

(71) Applicant: Electronics and Telecommunications Research Institute, Daejeon (KR)

(72) Inventors: Jeom Ja Kang, Daejeon (KR); Kiyoung Park, Daejeon (KR); Hwajeon Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 160 days.

(21) Appl. No.: 18/540,594

(22) Filed: Dec. 14, 2023

(65) Prior Publication Data

US 2024/0203398 A1 Jun. 20, 2024

(30) Foreign Application Priority Data

Dec. 19, 2022 (KR) ........................ 10-2022-0178442

(51) Int. Cl.
*G10L 15/02* (2006.01)
*G06N 3/02* (2006.01)
(Continued)

(52) U.S. Cl.
CPC ................ *G10L 15/02* (2013.01); *G06N 3/02* (2013.01); *G06V 40/28* (2022.01); *G10L 15/26* (2013.01)

(58) Field of Classification Search
CPC ......... G10L 15/02; G10L 15/26; G10L 15/16; G10L 15/04; G10L 15/063; G10L 15/14;
(Continued)

(56) References Cited

U.S. PATENT DOCUMENTS 7,529,665 B2 5/2009 Kim et al.
8,612,211 B1 12/2013 Shires et al.
(Continued)

FOREIGN PATENT DOCUMENTS

CN 113762459 * 12/2021
EP 3 813 059 * 4/2021
(Continued)

OTHER PUBLICATIONS

Zlatintsi et al., "Audio Salient Detection and Summarization Using Audio and Text Modalities", 2015 23rd European Signal Processing Conference (EUSIPCO) (Year: 2015).*
(Continued)

*Primary Examiner* — Qian Yang
(74) *Attorney, Agent, or Firm* — Sughrue Mion, PLLC

(57) ABSTRACT

Disclosed herein is a voice recognition system with an enhanced summarization function according to the present invention. The voice recognition system include: an audio feature extractor configured to extract a voice feature from an audio signal to generate a feature vector; a salience extractor configured to extract a importance of speech from at least one of the audio signal or a video signal to generate an importance vector; and a neural network configured to output a recognition result based on the feature vector and the importance vector, in which the recognition result is output by masking some.

12 Claims, 2 Drawing Sheets

(51) Int. Cl.
*G06V 40/20* (2022.01)
*G10L 15/26* (2006.01)

(58) Field of Classification Search
CPC ............. G10L 15/24; G10L 2015/0635; G10L 2015/221; G06N 3/02; G06V 40/28
See application file for complete search history.

(56) References Cited

U.S. PATENT DOCUMENTS

| | | | | |
|---|---|---|---|---|
| 2014/0195226 | A1 | 7/2014 | Yun et al. | |
| 2017/0374359 | A1* | 12/2017 | Taniguchi | H04N 21/61 |
| 2021/0048382 | A1 | 2/2021 | Badri et al. | |
| 2022/0092276 | A1* | 3/2022 | Tu | G06F 40/58 |
| 2022/0366911 | A1* | 11/2022 | Carbune | G10L 15/22 |

FOREIGN PATENT DOCUMENTS

| | | | |
|---|---|---|---|
| JP | 3725470 | B2 | 12/2005 |
| JP | 5495964 | B2 | 5/2014 |
| KR | 10-2017-0107283 | A | 9/2017 |
| KR | 10-2022-0084359 | A | 6/2022 |

OTHER PUBLICATIONS

Machine translation for CN 113762459 (Year: 2021).*
Doulamis et al., "On-Line Retrainable Neural Networks: Improving the Performance of Neural Networks in Image Analysis Problems", IEEE Transactions on Neural Networks, vol. 11, No. 1, Jan. 2000 (Year: 2000).*
Setiono et al., "Neural-Network Feature Selector", IEEE Transactions on Neural Networks, vol. 8, No. 3, May 1997 (Year: 1997).*

* cited by examiner

FIG. 3

MULTI-MODAL VOICE RECOGNITION SYSTEM AND METHOD FOR CONVERSATION SUMMARIZATION

CROSS REFERENCE TO RELATED APPLICATION

The present application claims priority to Korean Patent Application No. 10-2022-0178442, filed on Dec. 19, 2022, the entire contents of which is incorporated herein for all purposes by this reference.

BACKGROUND OF THE INVENTION

Field of the Invention

The present invention relates to voice recognition, and more particularly to, a system and method for voice recognition that is capable of multi-modal voice recognition and summarization for a conversation.

Description of the Related Art

Recently, voice recognition and conversational language understanding technologies have been made a significant progress due to advancements in artificial intelligence and deep learning technologies.

For example, Korean Patent No. 10-2158743 discloses a data augmentation technology for improving the performance of natural language voice recognition, which includes augmenting voice data for speech rate variation among natural language speech variation characteristics, augmenting voice data for inaccurate pronunciation among the natural language speech variation characteristics, and training a voice recognition system based on a deep neural network using the augmented voice data for the speech rate variation and the inaccurate pronunciation, thereby improving the performance of the voice recognition system.

The voice recognition and conversational language understanding technology advanced as described above has been applied to various fields, one of which is a meeting minutes recording service, which provide an audio and video recording of a group of people having a conversation and automatically generate a transcript by converting the participants' vocalization contents into a text.

However, the automatic generation of transcripts of conversation or meeting means accurately recognizing the vocalizations of multiple speakers and converting the vocalization into a text just as being vocalized. Though there are some needs for such a wholly converted transcript, it is used in most actual use cases to make summary by manually summarizing the important parts of the conversation or meeting by human.

In this regard, research has been initiated on technologies that analyze the content of a conversation or meeting and automatically generate a summary of the important material. However, there are still no specific solutions for the selection of important keywords and the improvement of recognition performance for the important keywords.

SUMMARY OF THE INVENTION

The present invention is directed to providing a voice recognition system and method that is capable of better recognizing important words in a full text, of a conversational voice.

There is provided a voice recognition system according to the present invention. The voice recognition system may include: an audio feature extractor configured to extract a voice feature from an audio signal to generate a feature vector; an audio/video salience extractor configured to extract a importance of speech from at least one of the audio signal or a video signal to generate an importance vector; and a neural network configured to output a recognition result based on the feature vector and the importance vector, in which the recognition result is output by masking some words from a target output, and may be a multi-modal system that is configured to acquire both voice and video.

The audio feature extractor generates the feature vector of a fixed length by splitting the audio signal into short voices of 10 to 30 msec.

The audio/video salience extractor extracts magnitude and pitch information on the voice signal from the audio signal to extract a word or segment that is emphasized or of high interest by a speaker, or, in addition to the audio signal, extracts information that is indicative of interest in speech content, including gaze information on participants from the video signal.

In an embodiment, the neural network includes: an acoustic model generator configured to generate an acoustic model based on the feature vector and the importance vector; and a recognition result output unit configured to output a recognition result based on the acoustic model, wherein the recognition result is output by masking some words from the target output.

The recognition result output unit may mask a word with the degree of importance below a predetermined threshold in the target output, in which the recognition result output unit selects the words to be masked in a manner that masks a predetermined number of words in low rank with low importance depending on an output of the audio/video salience extractor.

According to another aspect of the present invention, there may be provided a multi-modal voice recognition system including: an audio feature extractor configured to extract a voice feature from an audio signal to generate a feature vector; a salience extractor configured to extract an importance of speech from the audio signal and the video signal to generate an importance vector; a preprocessing unit configured to concatenate the feature vector and the importance vector by a predetermined interval; an encoder configured to generate an acoustic model based on the concatenated vector; a buffer configured to store an output of the encoder; and a decoder configured to output a recognition result based on the output of the encoder, in which the recognition result is output by masking some words in the target output.

According to still another aspect of the present invention, there may be provided a voice recognition method comprising: generating a voice feature vector by extracting a voice feature from an audio signal; generating an importance vector by measuring an importance of speech; generating an acoustic model based on the feature vector and the importance vector; outputting a recognition result based on the acoustic model, wherein the recognition result is output by masking words having the degree of importance below a predetermined threshold in a target output; and retraining a voice recognition neural network based on the masked target output.

According to the present invention, it is possible to improve recognition performance for important words by selecting the key words in a meeting or conversation involving a large number of people and enhancing training therefor.

BRIEF DESCRIPTION OF THE DRAWINGS

FIG. 3 is a flowchart of a voice recognition method according to the present invention.

DETAILED DESCRIPTION OF THE INVENTION

Figure 1:
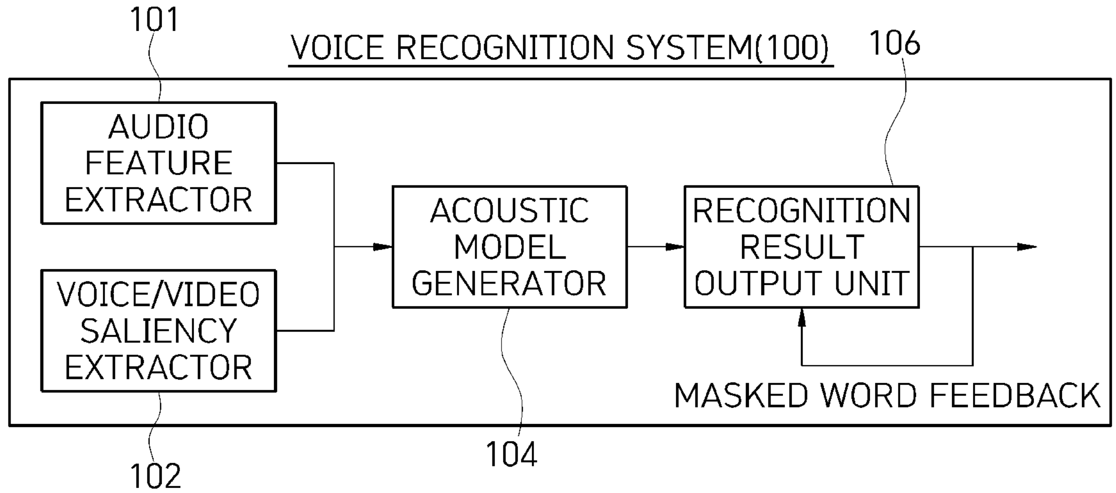
FIG. 1 is a basic block diagram of a voice recognition system according to the present invention.

Advantages and features of the present invention and methods of achieving the advantages and features will be clear with reference to embodiments described in detail below together with the accompanying drawings. However, the present invention is not limited to the embodiments disclosed below, but may of course be implemented in various forms within the scope of the present invention as defined by the description of the claims.

The terms used in the present specification are for explaining the exemplary embodiments, not for limiting the present invention. Unless particularly stated otherwise in the present specification, a singular form also includes a plural form. The term "comprise" and/or "comprising" used in the specification does not exclude existence or addition of one or more other constituent elements in addition to the mentioned constituent element. Like reference denotations refer to like elements throughout the specification. As used herein, the term "and/or" includes each and all combinations of one or more of the mentioned components. Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present invention.

Unless otherwise defined, all terms (including technical and scientific terms) used in the present specification are used as the meaning which may be commonly understood by the person with ordinary skill in the art, to which the present invention belongs.

Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

While a conventional transcript generation system accurately recognizes the vocalizations of multiple speakers and converts the vocalizations into a text, a voice recognition system according to the present invention automatically judges only an important part of the vocalization contents and reproduces the important part into a short sentence, and thus focuses on accurately recognizing a word that has key meanings in the vocalization content rather than accurately recognizing all the vocalizations of a user.

To this end, the voice recognition system, according to the present invention, that performs voice recognition and summary generation in a multi-speaker meeting environment using multi-modality or audio signals measures the importance of speech using signal intensity information, gaze information on participants, etc. for an input signal for each modality, and uses this as input to a neural network. And the output of the neural network masking the words other than important words with different symbols according to an importance of the linguistic meaning of speech content.

Hereinafter, the configuration of the present invention will be described in detail with reference to the drawings.

FIG. 1 is a conceptual basic block diagram of a voice recognition system 100 for conversation summarization according to the present invention. The voice recognition system 100 may be configured to acquire voice using a microphone (not illustrated), but is preferably a multi-modal system that acquires voice, video, etc. using two or more sensors, and includes an audio feature extractor 101, an audio/video salience extractor 102, an acoustic model generator 104, and a recognition result output unit 106. The acoustic model generator 104 and the recognition result output unit 106 may be implemented as separate or as one neural network.

The audio feature extractor 101 extracts a feature vector for voice recognition from an audio signal. For example, the audio signal is split into short voices of 10 to 30 msec to generate the feature vector of a fixed length. The audio feature extractor 101 may use a variety of feature vectors, such as a logmel spectrum used in a conventional voice recognizer.

The audio/video salience extractor 102 is a module that generates an importance vector by measuring a current importance of speech from an audio signal and/or a video signal. That is, the audio/video salience extractor 102 extracts important information contained in a voice, and in case of multi-modality, the important information may be extracted not only from a voice but also from a video. For example, from the audio signal, magnitude and pitch information on a voice signal is extracted to extract a word or segment that is emphasized or of high interest by a speaker. Gaze information on participants may be included in the video signal, and other information that may indicate interest in speech content (such as gesture information for emphasis or agreement) is extracted in units of frames from the video signal.

The acoustic model generator 104 receives the feature vector of the voice from the audio feature extractor 101 as input and represents the feature vector as an acoustic model vector. This is similar to an encoder employed by a conventional voice recognition method. However, the acoustic model generator 104 according to the present invention has a significant difference in generating an acoustic model by receiving important information from the audio/video salience extractor 102 as well as the feature vector of the voice as input and applying the important information to the corresponding feature vector of the voice. The acoustic model may be built for key words in a conversation or meeting through this process.

To this end, a new input vector is created by concatenating the selected feature vectors and importance vectors extracted from the audio feature extractor 101 and audio/video salience extractor 102 for each frame to create the acoustic model based on the new input vector. The concatenation of the feature vectors may be performed by the acoustic model generator 104 or by a separate preprocessor preceding the acoustic model generator 104.

The recognition result output unit 106 outputs a recognition result with improved recognition performance for key words. Like a general decoder in the field of voice recognition, a string is obtained based on a result from an encoder. The conventional decoder either selects a method of finding a string with the highest probability by calculating the probability of all strings, or, due to the inefficiency of this method (the number of possible characters increases exponentially with the length of the string), uses a heuristic search algorithm that uses a beam search to select only the top B predetermined probability character combinations (where B is a natural number equal to or greater than 1) from the number of possible character cases to be selected next, and then repeat until a target string is found. However, the recognition result output unit 106 according to the present invention improves the efficiency of deriving a recognition result because the input latent variable or word label already reflects important information (salience) extracted from the voice/video.

In addition, the conventional recognizer accurately transcribes a sentence contained in a voice signal during a training process, presents this text as a target output, and trains a network such that an output of a decoder is consistent with the target output. However, there is a difference in that, in the present invention, a masked text is used as a target output. Masking a text means replacing the corresponding word with a symbol that is separately defined, such as '<MASK>'.

While the selection of words to be masked and masking may be performed manually by an administrator, it is obviously possible that the system may automatically proceed by a method such as masking all but a top predetermined number of words of high importance, masking a bottom predetermined number of words of low importance, or otherwise, based on an output of the audio/video salience extractor 102. A result of the selection of words to be masked may be fed back to the audio/video salience extractor 102 to improve the performance of extracting the important information.

As a result, the voice recognition system 100 according to the present invention can output only important text as the target output, thereby preventing the training of the voice recognition neural network for words that are not necessary for summarization to increase the recognition performance by outputting only important words, and finally increase the summarization performance.

Figure 2:
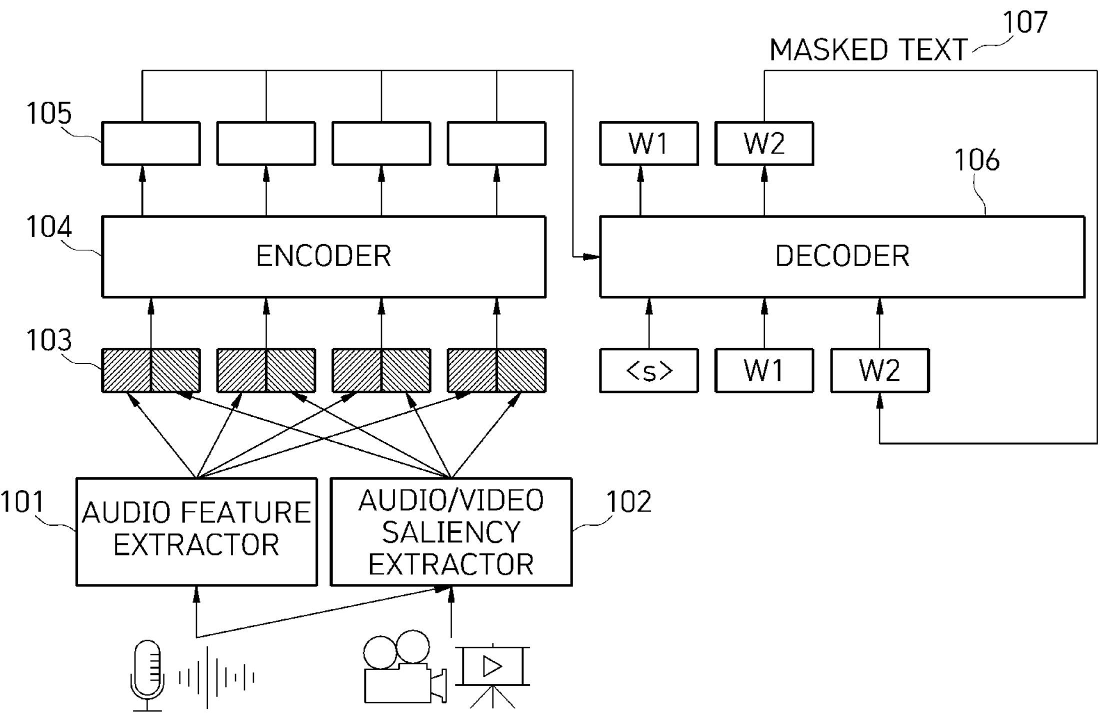
FIG. 2 is a configuration diagram of the voice recognition system according to an embodiment of the present invention.

Hereinafter, a preferred embodiment of the present invention will be described with reference to FIG. 2. Since the embodiment of FIG. 2 follows a general encoder-decoder structure for voice recognition, the terminology for the constituent elements may be described to be changed accordingly, but the constituent elements that substantially correspond to the embodiment of FIG. 1 will be given the same reference numerals and redundant descriptions will be omitted.

A preprocessing unit 103 concatenates the extracted voice feature vector and important information for each frame to create a new input vector. In this embodiment, the preprocessing unit 103 is separate, but may be a module performed within the acoustic model generator 104.

An output of an encoder 104 is transmitted to a decoder 106 via a buffer 105. The encoder 104, buffer 105, and decoder 106 may use a transformer, for example.

An unimportant word W2 in a target output of the decoder 106 is masked. For example, the W2 is replaced by <MASK>. As described above, in the present invention, the masked text is used as the target output of the decoder 106.

In the end, the acoustic model is created based on the extracted important information, and the unimportant words are masked from the target output of the recognition result to ensure that only the important text is output, so that no training is performed on words that are not necessary for the summarization. Accordingly, the voice recognition system according to the present invention can output only important words, improve recognition performance for the corresponding words, and increase the accuracy and efficiency of summarization.

The training based on an output value reflecting the masking may be performed on the encoder 104 as well as the decoder 106. Further, the training reflecting the masking may also be performed on the audio feature extractor 101 and/or the audio/video salience extractor 102.

Figure 3:
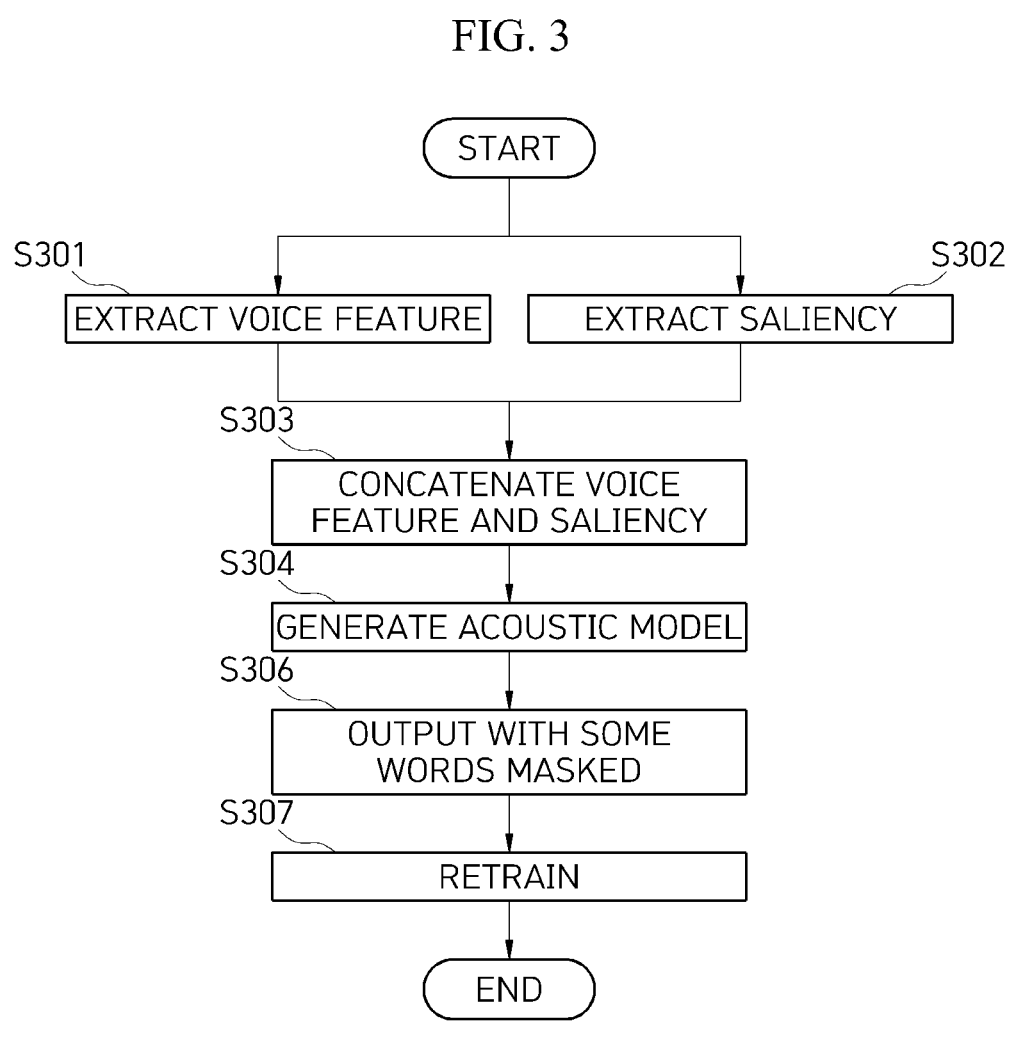

FIG. 3 is a flowchart of a voice recognition method according to the present invention.

The feature vector for voice recognition is extracted from the audio signal (S301). For example, the audio signal is split into short voices of 10 to 30 msec to generate the feature vector of a fixed length. A variety of feature vectors, such as a logmel spectrum used in a conventional voice recognizer may be used.

Simultaneously, the audio/video salience extractor 102 measures and vectors the current importance of speech from the audio signal and/or video signal. That is, the important information is extracted. For example, from the audio signal, magnitude and pitch information on a voice signal is extracted to extract a word or segment that is emphasized or of high interest by a speaker. Gaze information on participants may be included in the video signal, and other information that may indicate interest in speech content (such as gesture information for emphasis or agreement) is extracted in units of frames from the video signal.

The simultaneously acquired voice feature vectors and importance vectors are mutually concatenated into a predetermined unit (e.g., a frame) (S303). The mutual concatenation of the vectors may be performed by the preprocessing unit or the acoustic model generator 104.

Next, the acoustic model reflecting the importance for each word is generated based on the concatenated vectors (S304).

The recognition result output unit outputs, based on the acoustic model, a recognition result that focuses on the text with high importance (S306). In the present invention, what is important for the target output is to mask the unimportant text. Masking a text means replacing the corresponding word with a symbol that is separately defined, such as '<MASK>'.

While the selection of words to be masked and masking may be performed manually by an administrator, it is obviously possible that the system may automatically proceed by a method such as masking all but a top predetermined number of words of high importance, masking a bottom predetermined number of words of low importance, or otherwise, based on an output of the audio/video salience extractor 102. A result of the selection of words to be masked may be fed back to the audio/video salience extractor 102 to improve the performance of extracting the important information.

Some or all of the audio feature extractor 101, acoustic model generator 104, and recognition result output unit 106 may be retrained based on the masked target output (S307).

While the configuration of the present invention has been described above with reference to some embodiments, the present invention is not limited to the specific embodiments described above, and those skilled in the art to which the present invention belongs will be able to make various modifications and changes without departing from the spirit of the present invention as described and claimed herein, but such modifications and changes will not be understood separately from the technical spirit or view of the present invention. Therefore, the protection scope of the present invention should be determined by the description of the appended claims.

What is claimed is:

1. A voice recognition system comprising:

an encoder configured to receive an audio signal or a video signal, extract a voice feature from the audio signal, and extract an importance of speech from at least one of the audio signal or the video signal to generate an importance vector; and a decoder configured to output a recognition result based on the feature vector and the importance vector, wherein the recognition result is output by masking words;

wherein the encoder and the decoder is implemented by at least one neural network, wherein the at least on neural network is trained using a masked text as a target output, the masked text being generated by replacing unimportant words with a mask symbol, such that training of the neural network for words that are not necessary for summarization is prevented, and wherein a result of selection of words to be masked is fed back to the at least on neural network to retrain the at least on neural network for extracting the importance of speech.

2. The voice recognition system of claim 1, wherein the voice recognition system is a multi-modal system configured to acquire both voice and video.

3. The voice recognition system of claim 1, wherein the encoder is configured to extract magnitude and pitch information on the voice signal from the audio signal to extract a word or segment that is emphasized or of high interest by a speaker.

4. The voice recognition system of claim 1, wherein the encoder is further configured to extract, in addition to the audio signal, information that is indicative of interest in speech content, including gaze information on participants, from the video signal.

5. The voice recognition system of claim 1, wherein the encoder is further configured to generate an acoustic model based on a concatenated vector that is obtained by concatenating the feature vector and the importance vector for each unit interval.

6. The voice recognition system of claim 1, wherein the encoder is further configured to generate an acoustic model based on the feature vector and the importance vector; and the decoder is further configured to output a recognition result based on the acoustic model.

7. The voice recognition system of claim 6, wherein the decoder is configured to mask the word with a degree of importance below a predetermined reference in a target output.

8. The voice recognition system of claim 6, wherein the decoder is further configured to select the words to be masked in a manner that masks a predetermined number of words in low rank with low importance based on the voice feature extracted from the audio signal.

9. A voice recognition method comprising:

generating a voice feature vector by extracting a voice feature from an audio signal;

generating an importance vector by measuring an importance of speech;

generating an acoustic model based on the feature vector and the importance vector;

outputting a recognition result based on the acoustic model, wherein the recognition result is output by masking words having the degree of importance below a predetermined reference; and training a voice recognition neural network using a masked output as a target output, the masked output being generated by replacing words having the degree of importance below the predetermined reference with a mask symbol, such that training of the neural network for words that are not necessary for summarization is prevented, and wherein a result of selection of words to be masked is fed back retrain the neural network for measuring the importance of speech.

10. The voice recognition method of claim 9, further comprising:

concatenating to correlate the feature vector and the importance vector by a predetermined identical interval.

11. The voice recognition method of claim 9, wherein the generating of the importance vector comprises:

extracting magnitude and pitch information on the voice signal from the audio signal; and extracting, from the video signal, gesture information in units of frames that is indicative of interest in speech content, including gaze information of participants.

12. The voice recognition method of claim 9, wherein the masking and outputting of the recognition result comprises masking all except a predetermined number of words in high rank with high importance in the output.

* * * * *